United States Patent [19]
Vankoughnett et al.

[11] 3,755,733
[45] Aug. 28, 1973

[54] MICROWAVE ABSORPTION MOISTURE GAUGE

[75] Inventors: Allan L. Vankoughnett; Walter Wyslouzil, both of Ottawa, Ontario, Canada

[73] Assignee: Canadian Patent and Development Limited, Ottawa, Ontario, Canada

[22] Filed: Mar. 13, 1972

[21] Appl. No.: 234,292

[52] U.S. Cl............................................ 324/58.5 A
[51] Int. Cl............................................. G01r 27/04
[58] Field of Search...................... 324/58.5 A, 58 A

[56] References Cited
UNITED STATES PATENTS
3,553,573  1/1971  Lundstrom et al. ........... 324/58.5 A
3,115,131  12/1963  Holliday........................ 324/58 A X

FOREIGN PATENTS OR APPLICATIONS
656,110  1/1963  Canada.......................... 324/58.5 A

*Primary Examiner*—Stanley T. Krawczewicz
*Attorney*—James R. Hughes

[57] ABSTRACT

A microwave absorption moisture gauge comprising an applicator containing the sample under test, a source of microwave energy connected via a first sampler to the applicator, a termination connected via a second sampler to the output of the applicator, a microwave switch connected to both first and second samplers, a detector connected to the switch, a switch driver connected to the switch for alternately connecting first and second samplers to the detector through the switch, a logarithmic amplifier connected to the output of the detector, a de-multiplexer connected to the output of the amplifier and synchronously to the switch driver to provide two outputs, the first of which is the log of a signal related to the microwave power passing through the first sampler and the second is the log of a signal related to the microwave power passing through the second sampler, and a difference amplifier connected to the two said outputs to give an output which is the log of the ratio of the said two signals.

1 Claim, 6 Drawing Figures

PATENTED AUG 28 1973 3,755,733

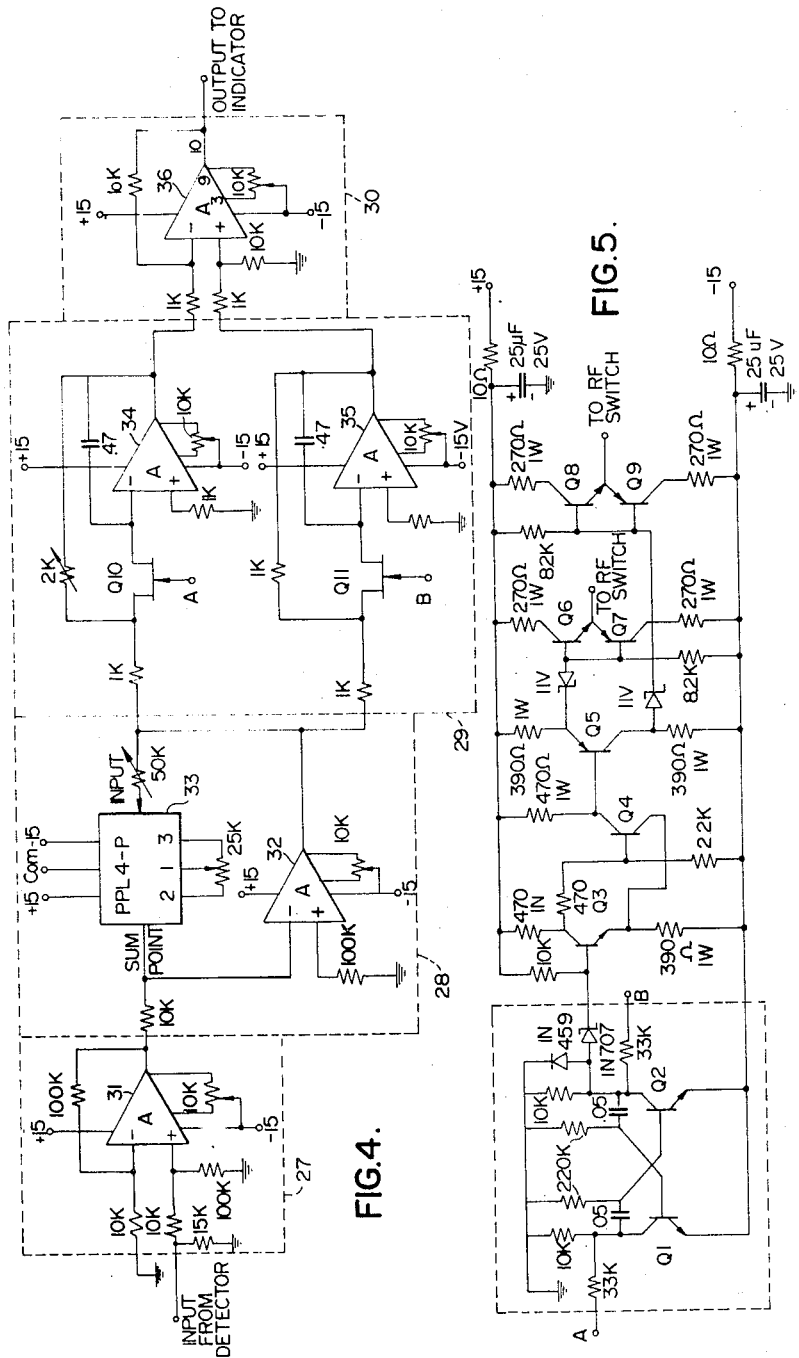

MICROWAVE ABSORPTION MOISTURE GAUGE

This invention relates to a microwave absorption moisture gauge and more particularly to a microwave apparatus for measuring the moisture content of a material placed in a microwave applicator device.

Absoption type microwave moisture gauges and detectors are known and in general these operate on the basis of the measurement of the attentuation of microwave energy passing through a sample under test. Microwave power is fed to one port of an applicator such as a section of wave-guide through which the material to be measured is passed, and the residual microwave power is taken from another port. The input and output power levels are measured and the ratio of these is a function of the moisture content of the material.

The simplest device that may be used is a microwave source, an applicator which would contain the material under test, an output detector for detecting the residual microwave power and some sort of meter or read-out device. An alternative to this would have a sampler in the output line, the latter being connected to a non-reflecting termination. The sampler would give an output to a detector and a read-out device. The detector would be a microwave to DC converter. These systems are simple but rely upon the output of the microwave source being stable and the sensitivity and response law of the detector being constant. These are not adequately constant quantities.

A better arrangement would have the microwave source connected to a power splitter which splits the energy into two paths, one of which contains the applicator and the other a calibrated variable attenuator and a phase shifter. The two outputs are recombined and delivered to a detector and read-out device. To operate, the variable attenuator and phase shifter are adjusted until there is a null in the detector. When this is achieved, the reading on the variable attenuator and the attenuation of the sample in the applicator are equal. This arrangement is most accurate and stable but has mechanically moving parts, is slow in response, is costly to build, and very difficult to automate.

It is an object of the present invention to provide a microwave absorption moisture gauge whose output is insensitive to microwave power source level and detector sensitivity.

It is another object of the invention to provide a moisture gauge that incorporates many of the best features of the simple single channel device and the double channel null system described above.

These and other objects of the invention are achieved by a microwave absorption moisture gauge comprising an applicator containing the sample under test, a source of microwave energy connected via a first sampler to the applicator, a termination connected via a second sampler to the output of the applicator, a microwave switch connected to both first and second samplers, a detector connected to the switch, a switch driver connected to the switch for alternately connecting first and second samplers to the detectors through the switch, a logarithmic amplifier connected to the output of the detector, a de-multiplexer connected to the output of the amplifier and synchronously to the switch driver to provide two outputs, the first of which is the log of a signal related to the microwave power passing through the first sampler and the second is the log of a signal related to the microwave power passing through the second sampler, and a difference amplifier connected to the two said outputs to give an output which is the log of the ratio of the said two signals.

In drawings which illustrate an embodiment of the invention,

FIG. 3 is a block diagram of a more detailed moisture gauge,

FIG. 4 is a circuit diagram of the pre-amplifier, logarithmic amplifier, de-multiplexer, and difference amplifier, FIG. 5 is a circuit diagram of the time base and switch driver.

Figure 1:
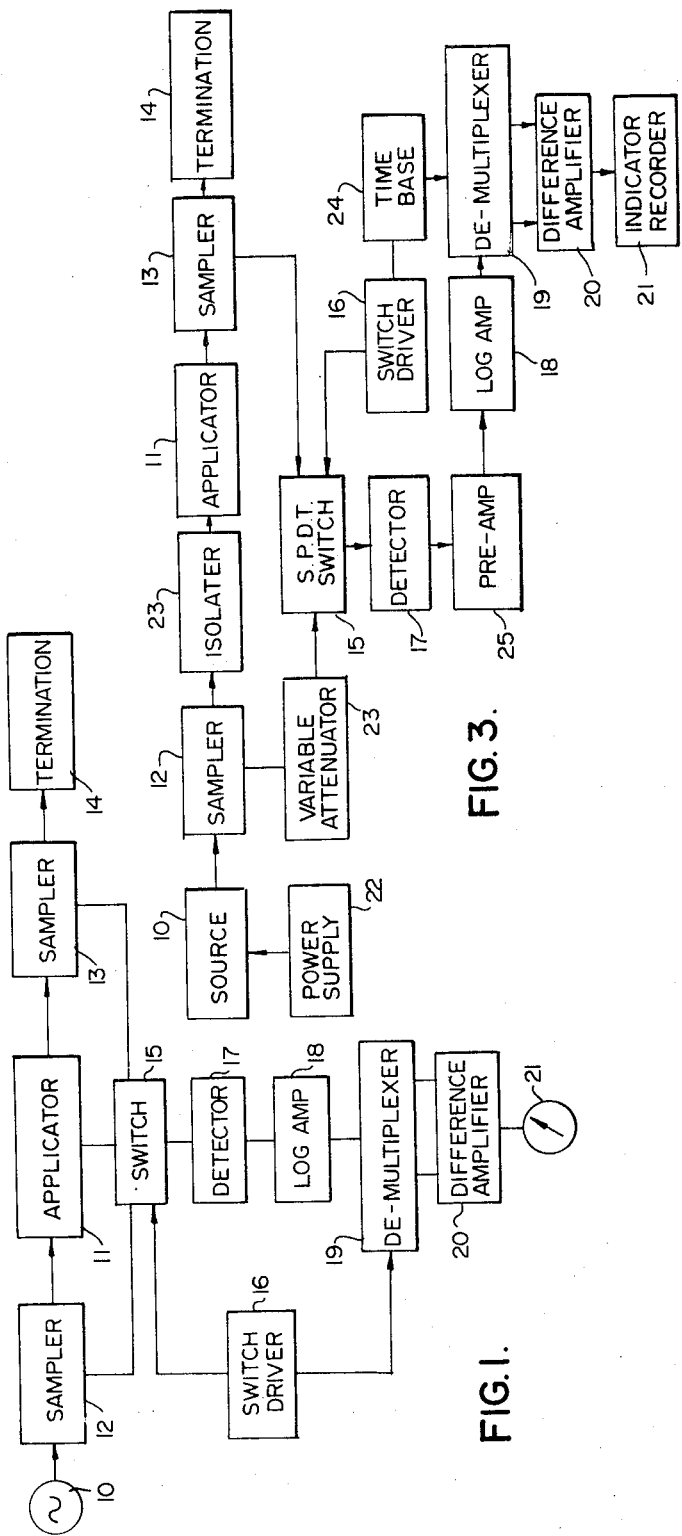
FIG. 1 is a block diagram of the basic gauge.
Figure 2:
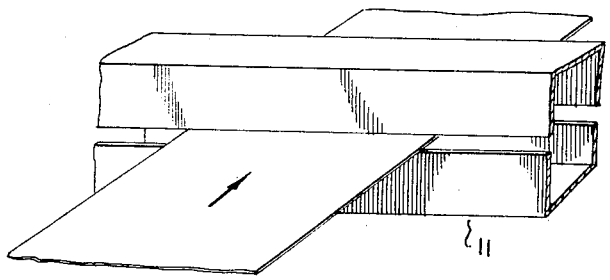
FIG. 2 is a view of a typical microwave applicator.

Referring to FIG. 1, a microwave source 10 provides RF energy to applicator 11 via a first sampler 12. The source might be typically a solid-state device although a magnetron or a klystron might also be used. The applicator can take various forms such as a section of slotted wave-guide through which the material sample, i.e. a web, strand, or film is passed (see FIG. 2). Moisture in the material attenuates the RF power and residual power passes via a second sampler 13 to a matched termination 14 to minimize standing waves. The samplers could be directional couplers or lightly coupled probes and provide signals to a solid-state switch (SPDT) 15. A switch driver 16 provides a switching signal to the switch such that detector 17 is alternately connected to the first and second samplers. The detector is a microwave to DC converter with an output that is a square wave with the two voltage levels proportional to the power of the two sampled signals. The detector is operated at power levels well below saturation. The output of the detector is amplified in logarithmic amplifier 18 and passed to de-multiplexer 19 that obtains a synchronous operating signal from switch driver 16. The de-multiplexer provides two outputs, the first of which is the log of the detector output voltage when connected to the first sampler (log A) and the second the log of the detector output when connected to second sampler (log B). A difference amplifier 20 gives an output that is log A − log B = log A/B and this may be read on a suitable meter 21 or other read-out device. The indicated output is merely insensitive to source level and detector sensitivity but does depend on detector response law. When operated at appropriate levels, the response law displays good stability.

FIG. 3 is a more detailed block diagram of apparatus built and tested. Components are numbered as in FIG. 1. A power supply 22 provides regulated voltage (e.g. +9V at about 200 mA) to the source and supply voltage (e.g. ±15V at 300 mA) for the rest of the circuitry. A low power isolater 23 is positioned between applicator 11 and sampler 12 to stabilize operation of the source and isolate sampler 12 from reflected power. A variable attenuator 23 is positioned between sampler 12 and SPDT switch 15 and is normally adjusted to compensate for the insertion loss of the sensor (applicator) so that the two RF signals arriving at the switch are of exactly the same amplitude when the sensor is "empty." When some material whose moisture is to be determined is present, the two signals will of course differ in accordance with the attenuation produced by the material in the sensor. A time base (clock) 24 provides a synchronizing signal to both the switch driver 16 and to de-multiplexer 19 which is used to separate the two voltage levels of the square wave generated by the logarithmic amplifier 18. A preamplifier 25 is used to amplify the output of detector 17 to provide a more appropriate signal level for the logarithmic amplifier.

FIG. 4 is a full circuit diagram of the preamplifier 27, logarithmic amplifier 28, de-multiplexer 29, and difference amplifier 30. The preamplifier consists of operational amplifier 31 and is generally conventional. The logarithmic amplifier consists of operational amplifier 32 with an active element 33 in the feedback loop to provide the required log function. The de-multiplexer consists of two sample and hold circuits 34 and 35 with attendant R-C elements. The field effect transistors Q10 and Q11 in the inputs are switched on and off alternately in synchronism by the time base at points A and B. The difference amplifier is operational amplifier 36 with suitable feedback.

FIG. 5 is a full circuit diagram of the time base generator which is a free running multivibrator made up of transistors Q1 and Q2 and which provides the switching pulses to points A and B (of FIG. 4) and swhich driver made up of amplifying stages Q3 and Q4, phase splitter Q5 and driver stages made up of complementary pairs Q6 - Q7 and Q8 - Q9. The two outputs are applied to the RF switch (see 15 of FIG. 3).

Figure 6:
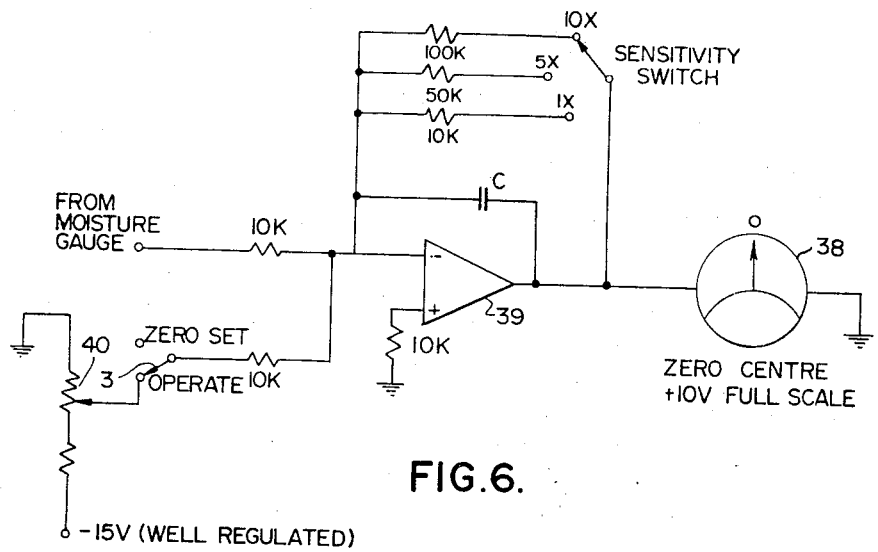
FIG. 6 is a circuit diagram of a zero-offset circuit that may be used in the output of the gauge.

FIG. 6 shows an optional circuit that may be connected to the output to provide DC offset which in effect allows reading from a zero position on the output meter 38. This circuit is normally operated by placing the switch S in the "zero set" position and with the sensor (wave-guide) empty, adjust the variable attenuator (23 of FIG. 3) to zero on the meter. A conditioned sample is placed in the sensor and with the switch S in the "operate" position, the precision potentiometer 40 is adjusted to provide zero on the meter again. The operational amplifier 39 provides sensitivity switching for the meter and the capacitor reduces the possibility of pickyp or oscillations due to long leads to the switches.

THEORY OF OPERATION OF THE MOISTURE GAUGE

When a crystal detector is operated in its square law region, its output is directly proportional to the input power. Let the voltage levels of the square wave generated at the detector be $E_1 = K_1 P_1$ and $E_2 = K_1 P_2$ where $P_1$ = power of signal arriving from source end of sensor, $P_2$ = power of signal sample arriving from load end of sensor, and, $K_1$ = constant of proportionality.

When no material is present in the sensor, and the variable attenuator is adjusted properly, $P_1 = P_2$. However, when material is present in the sensor, additional attenuation is produced which can be expressed as: Attenuation (in dB) = $10 \log_{10} (P_1/P_2)$.

With voltages $E_1$ and $E_2$ fed to the logarithmic amplifier, the corresponding output voltages will be equal to $K_2\log_{10}E_1$ and $K_2\log_{10}E_2$ where $K_2$ is a constant of proportionality determined by the characteristics of the log. amp. Hence the output from the difference amplifier with a voltage gain of 10 will be $E_0 = 10(K_2\log_{10}E_1 - K_2\log_{10}E_2)$
$= 10K_2(\log_{10}E_1 - \log_{10}E_2) = 10K_2\log_{10}E_1/E_2$
$= K_2 10 \log_{10}(K_1P_1/K_1P_2) = K_2 10 \log_{10}P_1/P_2$ so that $E_0 = K_2 \times$ Attenuation (in dB).

With the log. amp. suitably adjusted it can be seen that $K_2\log_{10}E_1 - K_2\log_{10}E_2 = 2$, for $E_2/E_1 = 10$. i.e., Output = 2 volts / decade.

Thus $K_2\log_{10}(E_1/E_2) = K_2\log_{10}10 = 2$

But $\log_{10}10 = 1$

Therefore $K_2 = 2$ and $E_0 = 2 \times$ Attenuation in dB. For example, an output of 2 volts indicates an attentuation of 1 dB. It is to be noted that the output is independent of absolute power levels, sensitivity of the detector and-preamplifier gain.

What is claimed is:

1. A microwave absorption moisture gauge comprising:
   a. a microwave applicator containing the sample under test,
   b. a source of microwave energy connected to an input port of the applicator,
   c. a first energy sampler connected between source and applicator,
   d. an energy absorbing termination connected to an output port of the applicator,
   e. a second energy sampler connected between applicator and sampler,
   f. a microwave switch connected to both first and second samplers,
   g. a detector connected to the switch,
   h. a switch driver connected to the switch for alternately connecting first and second samplers to the detector through the switch,
   i. a logarithmic amplifier connected to the output of the detector,
   j. a de-multiplexer connected to the output of the logarithmic amplifier and to the switch driver for synchronous operation, said de-multiplexer providing two outputs, the first of which is the log of a signal related to the microwave energy passing through the first sampler and the second of which is the log of a signal related to the microwave energy passing through the second sampler, and
   h. a difference amplifier connected to the two said outputs to give an output which is the log of the ratio of the said two signals.

* * * * *